United States Patent

Otaka

[11] Patent Number: 5,992,219
[45] Date of Patent: Nov. 30, 1999

[54] GAS FUEL SUPPLY PIPING SYSTEM

[75] Inventor: Akifumi Otaka, Saitama, Japan

[73] Assignee: Honda Giken Kogyo Kabushiki Kaisha, Tokyo, Japan

[21] Appl. No.: 09/119,609

[22] Filed: Jul. 22, 1998

[30] Foreign Application Priority Data

Jul. 24, 1997 [JP] Japan ................................. 9-212743

[51] Int. Cl.$^6$ ........................... G01M 3/32; F02M 37/04; B60K 16/08; F17C 5/02
[52] U.S. Cl. ...................... 73/40.5 R; 73/49.7; 73/118.1; 123/557; 137/590
[58] Field of Search ............................... 73/40.5 R, 49.7, 73/49.5, 118.1; 137/590; 123/557

[56] References Cited

U.S. PATENT DOCUMENTS

| | | | |
|---|---|---|---|
| 3,799,125 | 3/1974 | Hutchinson | 123/3 |
| 4,019,649 | 4/1977 | Simon | 220/88 B |
| 4,275,860 | 6/1981 | Brabazon | 244/135 R |
| 4,519,356 | 5/1985 | Sarich | 123/533 |
| 4,706,636 | 11/1987 | Davis | 123/557 |
| 5,046,519 | 9/1991 | Stenstrom et al. | 137/1 |
| 5,102,012 | 4/1992 | Foster | 222/40 |
| 5,131,262 | 7/1992 | Wood et al. | 73/40.5 R |
| 5,179,922 | 1/1993 | Bartholomew | 123/198 DB |
| 5,187,973 | 2/1993 | Kunze et al. | 73/40.5 R |
| 5,283,552 | 2/1994 | Sol | 340/605 |
| 5,305,714 | 4/1994 | Sekiguchi et al. | 123/3 |
| 5,327,776 | 7/1994 | Yasui et al. | 73/49.2 |
| 5,370,159 | 12/1994 | Price | 141/4 |
| 5,595,163 | 1/1997 | Nogi et al. | 123/494 |
| 5,816,224 | 10/1998 | Welsh et al. | 123/525 |
| 5,823,169 | 10/1998 | Strohl et al. | 123/516 |
| 5,869,746 | 2/1999 | Watanabe et al. | 73/49.7 |

FOREIGN PATENT DOCUMENTS 7-301359 11/1995 Japan .

*Primary Examiner*—Hezron Williams
*Assistant Examiner*—J. David Wiggins
*Attorney, Agent, or Firm*—Armstrong, Westerman, Hattori, McLeland & Naughton

[57] ABSTRACT

The leakage inspection for a compressed natural gas (CNG) supply piping system where a filling passage 4 and a supplying passage 5 are provided in a valve body 3 which serves as a block of a CNG fuel container. The filling passage 4 and the supplying passage are provided with a manual stop valves 13 and 7. A solenoid valve 8 is disposed at an open end of the supplying passage 8. A CNG filling inlet 10 is provided at an outer end of a filling conduit 9 communicated to the filling passage 4. A conduit 12 extending to an engine is provided with an inspection gas inlet 14. For the leakage inspection, the stop valves 7 and 13 are closed and an inspection gas is introduced from a leakage inspection gas inlet 14 and the filling inlet 10. It is examined by measuring a pressure change in the conduits 9 and 12 to determine whether or not a leakage problem is occurring.

21 Claims, 5 Drawing Sheets

F I G. 1
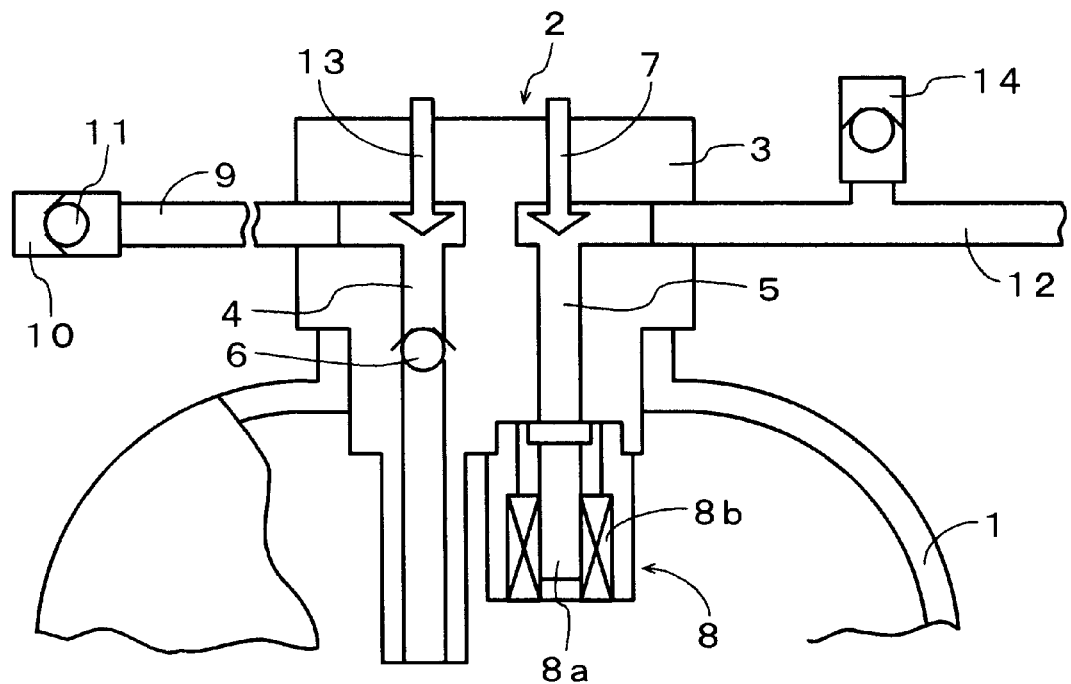
F I G. 2
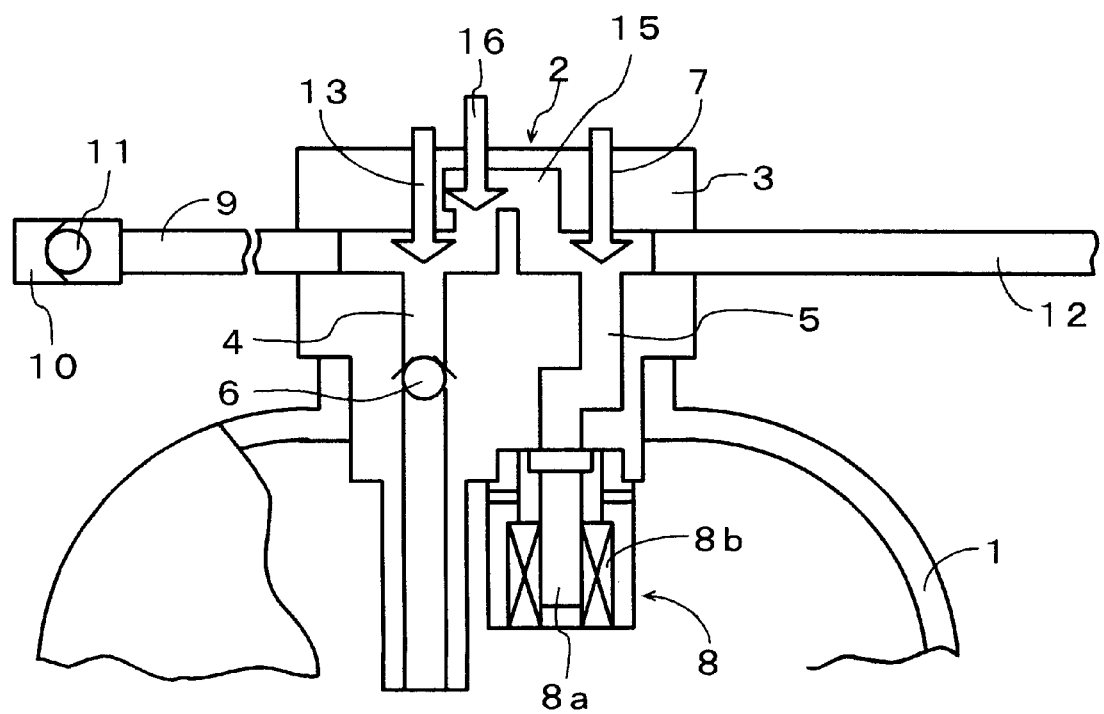

GAS FUEL SUPPLY PIPING SYSTEM

BACKGROUND OF THE INVENTION

1. Field of the Invention

The present invention relates to a gas fuel piping system and particularly, to a gas fuel piping system having a structure suited for inspection of leakage in the piping.

2. Description of the Related Art

Automobile, for example, has sometimes piping system for filling a fuel container or a tank with gas fuel and supplying a flow of the gas fuel from the fuel container to an engine. An example of a gas fuel container in the conventional piping systems for automobile is shown in FIG. 10 where compressed natural gas (CNG) is used as the fuel. As shown, the fuel container 1 filled with the CNG has a valve assembly 2 mounted in an inlet thereof. The valve assembly 2 includes a valve body or block member 3 in which a filling passage 4 and a supplying passage 5 are provided. The valve body 3 serves as a plug of the fuel container 1. A check valve 6 and a manual stop valve 7 are disposed across the filling passage 4 and the supplying passage 5, respectively. A solenoid valve 8 is mounted to an open end at the fuel container 1 side of the supplying passage 5 for opening and closing the open end. A CNG filling inlet 10 is provided on the outward end of a filling conduit 9 connected to the filling passage 4. Also, a check valve 11 is disposed in the filling inlet 10. The supplying passage 5 is joined to a supplying conduit 12 connected to an engine (not shown). The filling passage 4 and the supplying passage 5 are a couple of bores provided in the valve body 3 for communication with the filling conduit 9 and the supplying conduit 12 which are usually pipes connected with the bores, respectively.

For filling the fuel container 1 with the CNG, the solenoid valve 8 is closed to shut up the supplying passage 5. A flow of CNG is introduced to the filling inlet 10 and forced through the conduit 9 and the filling passage 4 to the fuel container 1. For supplying the CNG to the engine, the solenoid valve 8 is opened to clear the supplying passage 5. Upon the manual stop valve 7 being opened, the CNG is supplied through the supplying passage 5 and the conduit 12 to the engine. In case that the solenoid valve 8 is fault, the manual stop valve 7 is closed to stop the supply of CNG to the engine.

The inspection for leakage in the system is carried out as follows. For inspecting the filling conduit 9, the solenoid valve 8 is first closed, and then an inspection gas, namely a nitrogen gas, is fed from the filling inlet 10 to fill the system including the fuel container 1. Then, any change in the pressure in the conduit 9 is examined to judge whether or not a leakage occurs. For inspecting the supplying conduit 12, the manual stop valve 7 is closed and an inspection or nitrogen gas is introduced from a leakage inspection gas inlet (not shown) provided in the conduit 12. As the conduit 12 has been filled with the nitrogen gas, it is checked from change in the pressure whether or not a leakage occurs.

The valve assembly mounted in the CNG filling inlet may be different in arrangement from the above mentioned, in which the filling passage and the supplying passage are not separated from each other but integrally provided for common use. For example, a modification of the CNG valve assembly is disclosed in Japanese Patent Laid-open Publication No. (Hei)7-301359 where the filling passage and the supplying passage are not separated but integrally provided.

Those known valve assemblies however have following disadvantages. For inspecting the filling passage piping or the conduit 9, not only the conduit 9 but also the fuel container 1 have to be filled with the inspection gas. This will take an extra length of time for the filling and consume more time for removal of the inspection gas, hence hardly increasing the operational efficiency of the leakage inspection. Also, a large volume of the nitrogen gas is needed for the leakage inspection.

SUMMARY OF THE INVENTION

It is thus an object of the present invention to provide a gas fuel supply piping system where the leakage inspection is conducted at a higher efficiency without taking steps of filling an inspection gas into a fuel container and discharging it from the container.

A gas fuel supply piping system with a first feature of the present invention includes a filling conduit for filling a fuel container with a gas fuel for an engine and a supplying conduit for supplying the gas fuel from the fuel container to the engine, and is characterized comprising: a filling passage for communicating the filling conduit to the fuel container; a supplying passage for communicating the supplying conduit to the fuel container; a filling passage stop valve for closing the filling passage; a supplying passage stop valve for closing the supplying passage; a gas filling inlet provided to an outward end of the filling conduit; and a leakage inspection gas filling inlet provided to the supplying conduit.

A second feature of the present invention is characterized in a bypass conduit for communicating between the filling conduit and the supplying conduit and an intermediate stop valve for closing the bypass conduit while the leakage inspection gas filling inlet is eliminated. A third feature of the present invention includes a heater provided adjacent to an open end at the fuel container side of the filling passage and/or supplying passage.

According to the first feature, the filling passage and the supplying passage are closed by their respective stop valves thus to isolate the filling conduit and the supplying conduit from the fuel container for the leakage inspection. According to the second feature, the filling conduit and the supplying conduit are disconnected from the fuel container with the filling passage stop valve and the supplying passage stop valve being closed and while are communicated to each other by the bypass conduit with the intermediate stop valve being opened. According to the third feature, the filling passage and/or the supplying passage are heated by the heater at the open end facing to the inside of the container.

BRIEF DESCRIPTION OF THE DRAWINGS

FIG. 1 is a structural view of a gas fuel supply piping system according to a first embodiment of the present invention;

FIG. 2 is a structural view of a gas fuel supply piping system according to a second embodiment of the present invention;

DETAILED DESCRIPTION OF THE PREFERRED EMBODIMENTS

Figure 10:
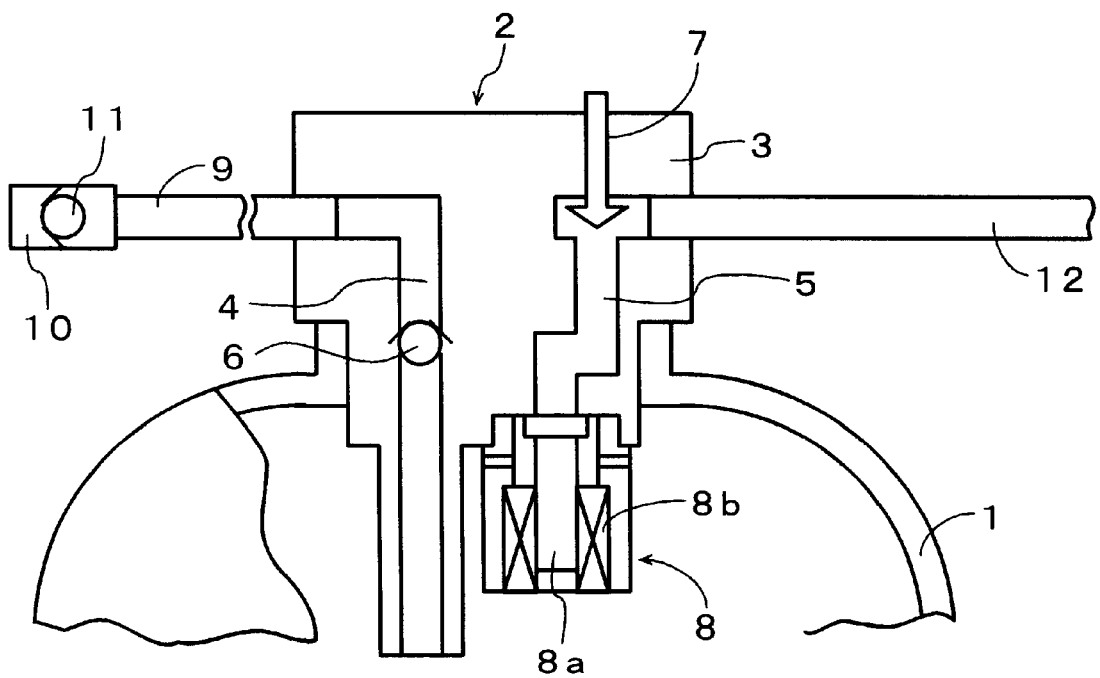
FIG. 10 is a structural view of a conventional gas fuel supply piping system.

The present invention will be described in more detail referring to the accompanying drawings. FIG. 1 illustrates a primary part of a CNG piping system for an automobile engine according to a first embodiment of the present invention. Like components are denoted by like numerals as those shown in FIG. 10 throughout the drawings.

As shown in FIG. 1, a supplying conduit 12 is joined to an engine (not shown). A solenoid valve 8 has a plunger 8a for forward and backward movements. The plunger 8a is urged at its distal end against an open end of a supplying passage 5, which opens to the inside of the fuel container 1. In response to a CNG supply demand for the engine given by a controller (not shown), a coil 8b of the solenoid valve 8 is energized to draw in the plunger 8a and thus open the open end at the fuel container 1 side of the supplying passage 5.

In addition to a manual stop valve (a first stop valve) 7, a second stop valve 13 is provided between a filling inlet 10 and a check valve 6. A supplying conduit 12 is provided with a leakage inspection gas inlet 14 to introduce the leakage inspection gas into the supplying conduit 12. The first stop valve 7 and the second stop valve 13 have corresponding valve members thereof threaded into a valve body 3. As the valve member is retracted or advanced using a tool such as a wrench, the filling passage 4 and the supplying passage 5 are opened or closed, respectively.

The leakage inspection is conducted in the following manner. For inspecting the filling conduit 9, the second stop valve 13 is closed and an inspection gas is introduced into the conduit 9 through the filling inlet 10. When the conduits 9 has been filled with the inspection gas at a predetermined pressure, a change in the pressure in the conduit 9 is monitored with a pressure gage (not shown) to determine whether or not some leakage occurs. For inspecting on the supply side, the first stop valve 7 is closed and the inspection gas is introduced into the supply conduit 12 through the leakage inspection gas inlet 14. After the conduit 12 has been filled with the inspection gas at a predetermined pressure, a change in the pressure in the conduit 12 is monitored with a pressure gage (not shown) to determine whether or not the leakage occurs. The leakage inspection requires no filling of the fuel container 1 with the inspection gas but permits the conduit 9 or 12, which is a target to be inspected, to be directly filled with the inspection gas.

After the leakage inspection is finished, both the first stop valve 7 and the second stop valve 12 are opened with the solenoid valve 8 being closed and the feeding of CNG through the filling inlet 10 follows. The solenoid valve 8 is urged by the spring to shut the passage 5. When CNG has been filled, a fuel supply demand is released from the controller to open the solenoid valve 8 for supply of the fuel to the engine.

A second embodiment of the present invention will now be described. FIG. 2 shows a primary part of the CNG piping system for the automobile engine according to the second embodiment of the present invention. The first stop valve 7 and the second stop valve 13 are provided across the filling passage 4 and the supplying passage 5, respectively. In particular, the filling passage 4 and the supplying passage 5 are communicated to each other with a bypass passage 15. A third or intermediate stop valve 16 is provided across the bypass passage 15 for closing and opening actions. In the second embodiment, the leakage inspection gas inlet is not provided while the filling inlet 10 is used in common for introduction of the CNG and the leakage inspection gas.

The leakage inspection is conducted in the following manner. The second stop valve 13 is closed to inhibit a flow of the gas to the check valve 6 and simultaneously, the first stop valve 7 is closed to stop a flow of the gas to the solenoid valve 8. Besides, the intermediate stop valve 16 is opened to communicate between the filling conduit 9 and the supplying conduit 12. As the inspection gas is introduced from the filling inlet 10, it runs into the conduits 9 and 12 while its flow to the fuel container 1 is inhibited. Then, it is checked for leakage in the same manner as of the first embodiment. Accordingly, both the filling conduit 9 and the supplying conduit 12 can be inspected for leakage at one time. If any trace of leakage is found in the check operation, the intermediate stop valve 16 is closed and the leakage inspection is repeated. The latter inspection allows to judge which of the filling conduit 9 and the supplying conduit 12 causes the leakage.

In a normal mode operation of the second embodiment, the first stop valve 7 and the second stop valve 13 are opened and the intermediate stop valve 16 and the solenoid valve 8 are closed before introducing the CNG into the container 1 through the filling inlet 10. When the introduction of the CNG is finished, the solenoid valve 8 is opened in response to the demands from the controller to supply the CNG to the engine.

Figure 3:
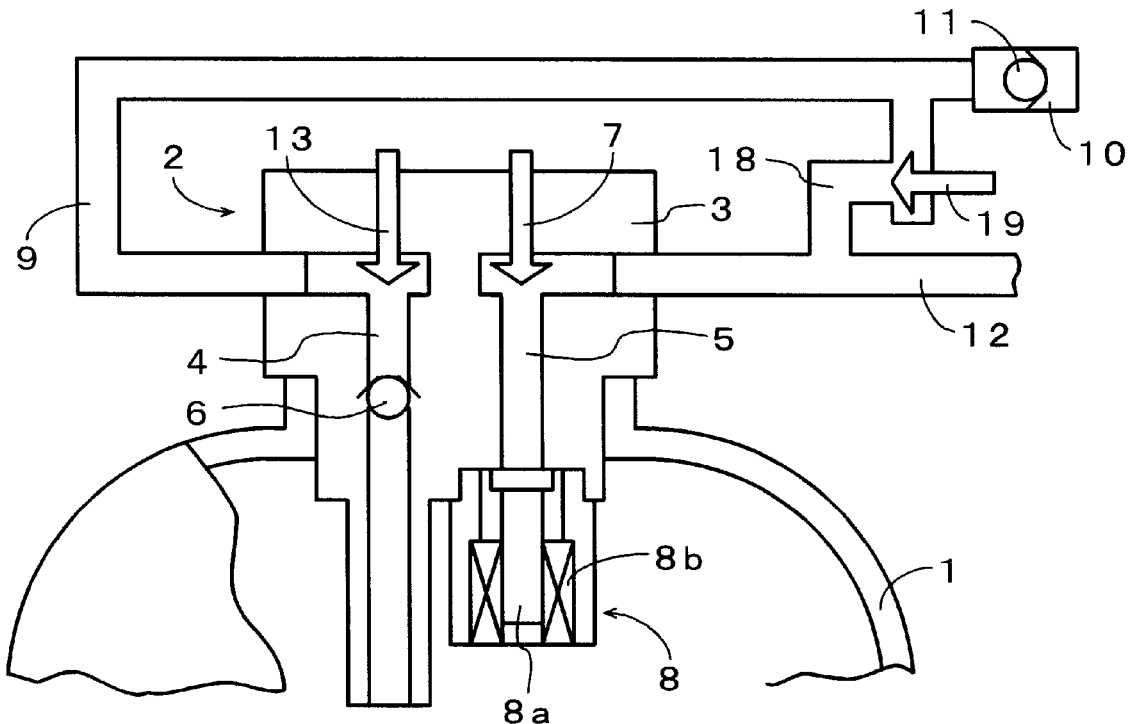
FIG. 3 is a structural view of a gas fuel supply piping system according to a third embodiment of the present invention.

A third embodiment of the present invention will be described as a modification of the second embodiment. FIG. 3 illustrates a primary part of a CNG piping system for an automobile engine according to the third embodiment. As shown, the filling passage 9 and the supplying passage 12 are communicated with each other by a bypass passage 18. The bypass passage 18 is in another form of the bypass passage 15, which is provided outside the valve body 3. A fourth or intermediate stop valve 19 is provided across the bypass passage 18 for its closing and opening actions. The intermediate stop valve 19 has the same function as of the intermediate stop valve 16 in FIG. 2.

The leakage inspection is conducted in the same manner as of the second embodiment. The first stop valve 7 and the second stop valve 13 are closed to inhibit the flow of the inspection gas to the solenoid valve 8 and the check valve 6, respectively. Simultaneously, the intermediate stop valve 19 is opened to communicate between the filling conduit 9 and the supplying conduit 12. When the inspection gas is introduced through the filling inlet 10, it runs into the conduits 9 and 12 while its flow to the fuel container 1 is blocked. Accordingly, both the filling conduit 9 and the supplying conduit 12 can be inspected for leakage at one time through carrying out the leakage inspection as in the first embodiment. If any leakage is found, the intermediate stop valve 19 is closed and the leakage inspection is repeated, like the second embodiment. The second inspection allows to judge which of the filling conduit 9 and the supplying conduit 12 generates the leakage.

In a normal mode operation, the first stop valve 7 and the second stop valve 13 are opened to clear the filling conduit 9, the filling passage 4, the supplying passage 5, and the supplying conduit 12 and simultaneously, the intermediate stop valve 19 and the solenoid valve 8 are closed to shut the bypass passage 18 before introducing the CNG into the filling inlet 10. When the introduction of the CNG is finished, the solenoid valve 8 is opened in response to the demands from the controller to supply the CNG to the engine.

Figure 5:
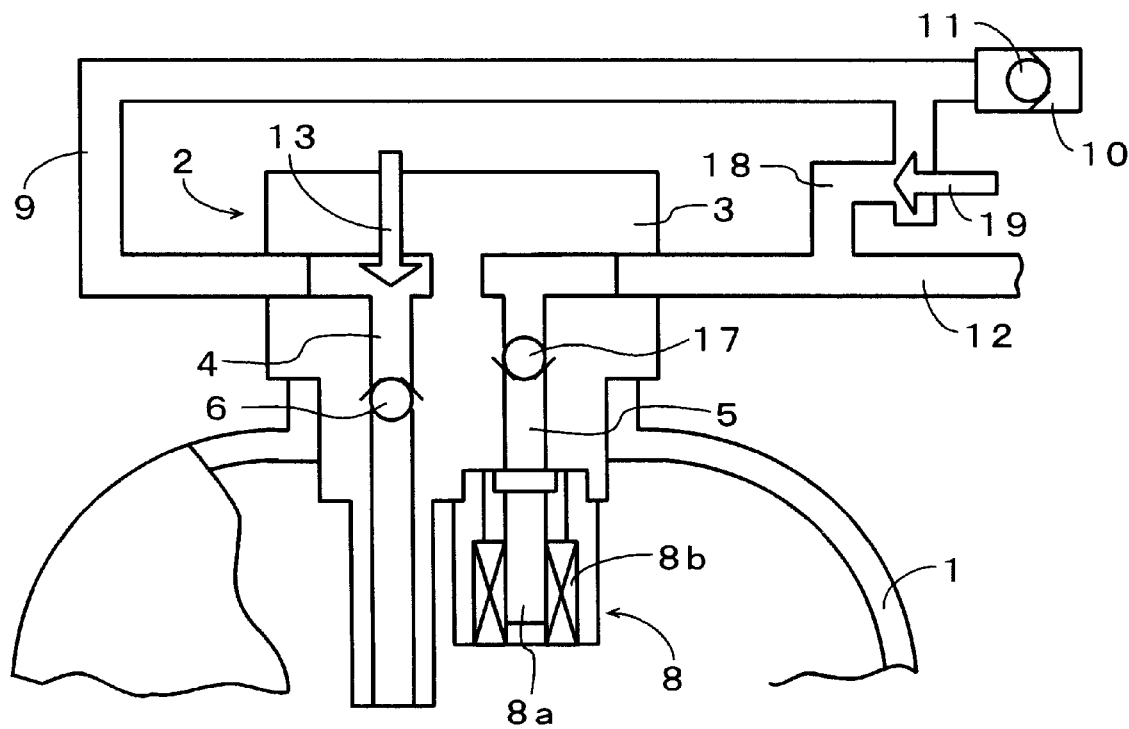
FIG. 5 is a structural view showing a modification of the gas fuel supply piping system of the third embodiment.
Figure 4:
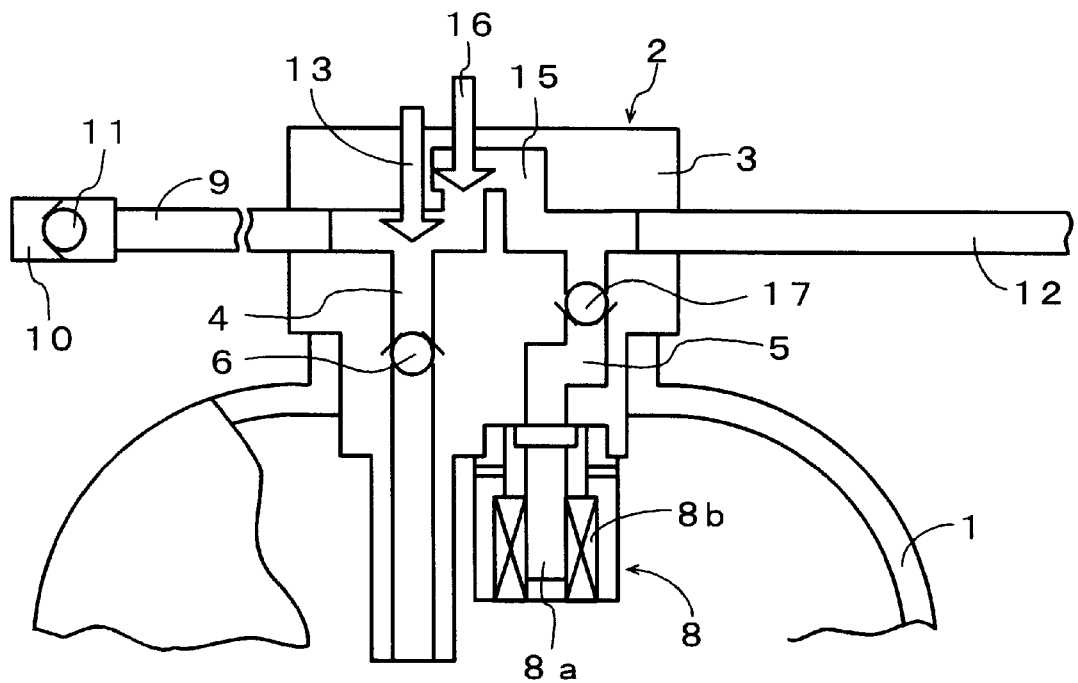
FIG. 4 is a structural view showing a modification of the gas fuel supply piping system of the second embodiment.

The second and third embodiments may be modified as follows. FIG. 4 shows a modification of the second embodiment while FIG. 5 shows a modification of the third embodiment, illustrating a different type of stop valve in the supplying passage 5. In each system, the first stop valve 7 is replaced with a check valve 17 provided across the supplying passage 5 for inhibiting the gas from backwards running into the fuel container 1. In FIG. 4, the second stop valve 13 and the intermediate stop valve 16 are only required to be actuated to switch between the leakage inspection mode and the normal operation. In FIG. 5, the second stop valve 13 and the intermediate stop valve 19 are only required to be actuated to switch between the two different operations.

Also, the embodiment shown in FIG. 1 may be modified by replacing the first stop valve 7 with a check valve across the supplying passage 5 to inhibit the backwards flow of the gas to the fuel container 1 during the leakage inspection.

A fourth embodiment of the present invention will now be described. When the fuel container 1 is filled with the CNG, the temperature of the valve body 3 sharply drops down due to Joule-Thomson effect. Consequently, resin components such as 0 rings (not shown), which are installed in the solenoid valve 8 of the valve body 3 for sealing of the valve member, may be affected by the sharp change in the temperature in thermal cycles and thus deteriorated with time in the quality.

Figure 6:
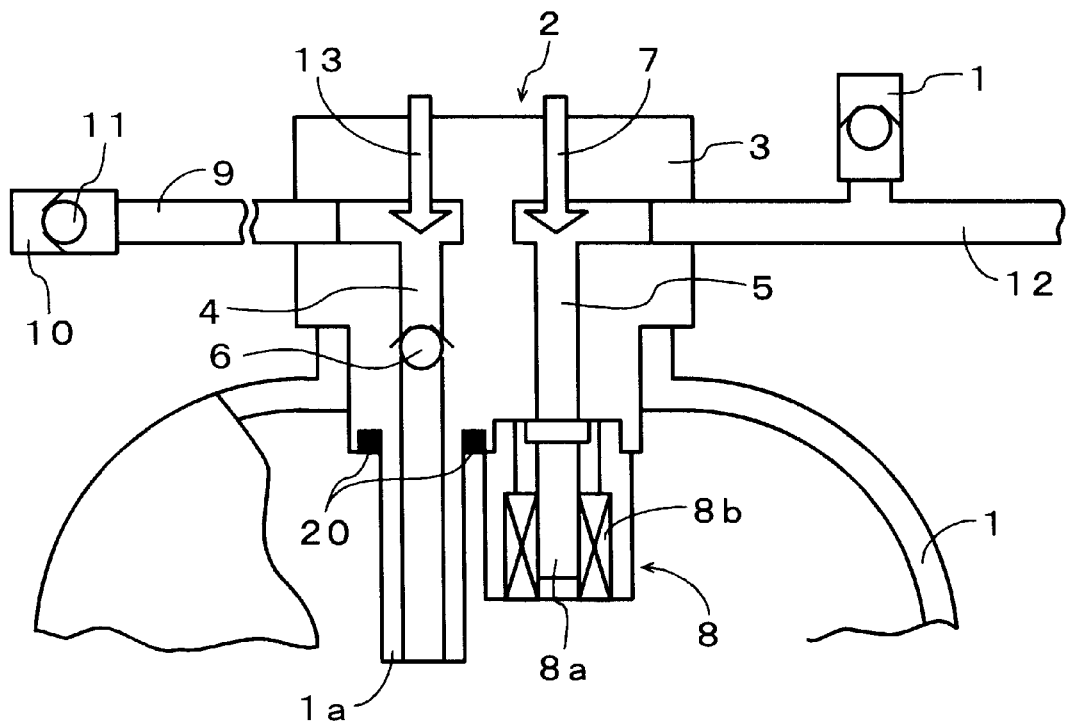
FIG. 6 is a structural view of a gas fuel supply piping system according to a fourth embodiment of the present invention.

For compensation, the fourth embodiment is provided with a heater mounted in the valve body 3 for preventing sharp drop of the temperature on the valve body 3 when the fuel container 1 is filled with the CNG. FIG. 6 illustrates a heater disposed in the piping system of the first embodiment. The heater 20 is fitted into a groove provided in the proximal end of a projection 1a of the fuel container 1 which extends along the filling passage 4. The heater 20 is provided on the CNG introduction side in the present embodiment, but it may be large enough to additionally surround the supplying passage 5 too in size. Preferably, the heater 20 is a ceramic heater protected with a ceramic sheath for preventing its heating region from being directly exposed to and reacting with the CNG. It is also possible that a non-ceramic type of the heater is mounted around the valve body 3 and covered with an appropriate enclosure for inhibiting the reaction with the CNG.

Figure 7A:
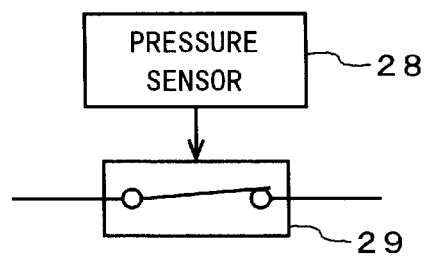
FIG. 7A is a block diagram showing a modification of the energizing circuit shown in FIG. 7.
Figure 7:
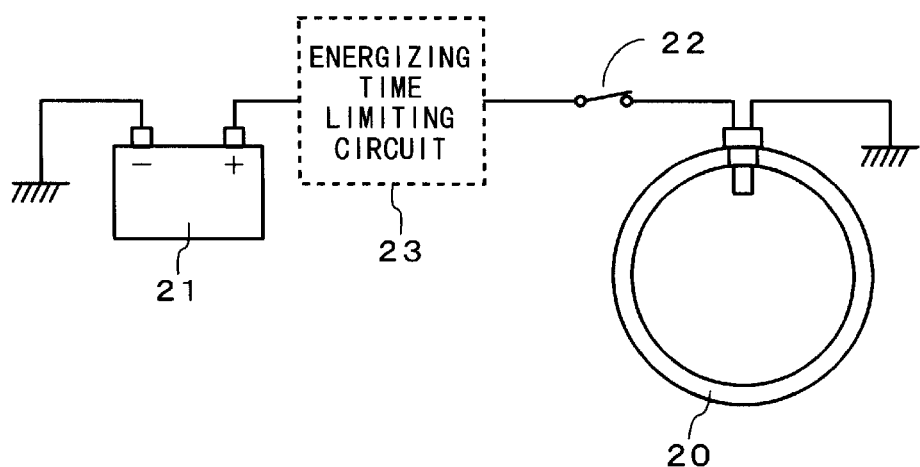
FIG. 7 is a circuit diagram showing an energizing circuit for a heater.

FIG. 7 illustrates a circuit for energizing the heater 20. As shown, the heater 20 is connected to a battery 21 commonly equipped in an automobile and a switch 22 is provided between the heater 20 and the battery 21. The switch 22 may be synchronized with the closing and opening action of a lid of the filling inlet 10 so as to energize the heater 20 when the lid is opened for filling the CNG and deenergize it when the lid is closed after completion of the filling.

In the circuit shown in FIG. 7, an energizing time limiting circuit 23 may be provided, which is responsive to the time up of a timer (not shown) for opening a normally closed contact (not shown) therein. More specifically, when the switch 22 is closed, the timer in the energizing time limiting circuit 23 starts counting. The time up of the timer triggers opening of the normally closed contact which is connected in series to a power supply 21. Accordingly, the heater 20 is deenergized when a predetermined duration of time T (see FIG. 8) set in the timer has elapsed from the opening of the fuel lid.

The energizing time limiting circuit 23 may include a pressure sensor 28 which detects increase of the pressure to a preset level in the fuel container 1 and produces its signal output to open the normally closed contact 29 for deenergizing the heater 20 as shown in FIG. 7A. As the pressure in the fuel container 1 is increased by the introduction of the CNG, Joule-Thomson effect declines to lessen a rate of the temperature drop. When the pressure of the CNG in the container has reached the preset value, the heater 20 may be designed to be deenergized. Desirably, the timer in the energizing time limiting circuit 23 may have a count up value preset based on the time from beginning of the CNG introduction into the container 1 to the pressure reaching a predetermined value in some experiments.

Figure 8:
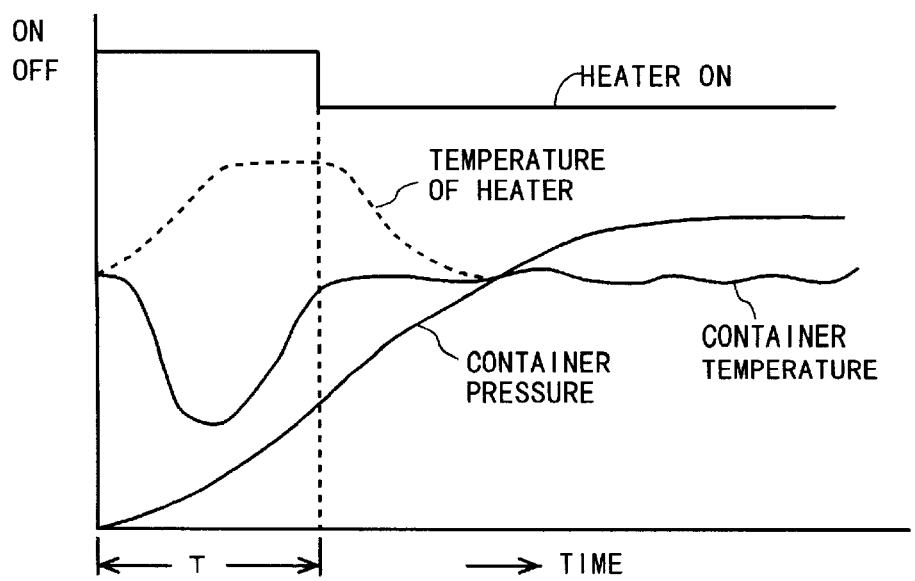
FIG. 8 is a diagram showing the relation of the pressure in and the temperature of the container, and the temperature of the heater with time in the gas fuel supply piping system of the embodiment according to the present invention.

FIG. 8 is a diagram showing relation of the pressure, the temperature of the valve body, and the temperature of the heater 20 in the fuel container with time. The heater 20 is kept energized till the time T has elapsed after turning on of the switch 22. As apparent from the diagram, the heater 20 increases its temperature as the time elapses. The container temperature drops due to the Joule-Thomson effect in the beginning and then soars as the temperature of the heater 20 increases. The pressure in the fuel container 1 rises as the introduction of CNG is proceeded. The setting or the count up value of the timer may be equal to a duration T from beginning of the CNG instruction to the returning of the container temperature to its initial degree.

Figure 9:
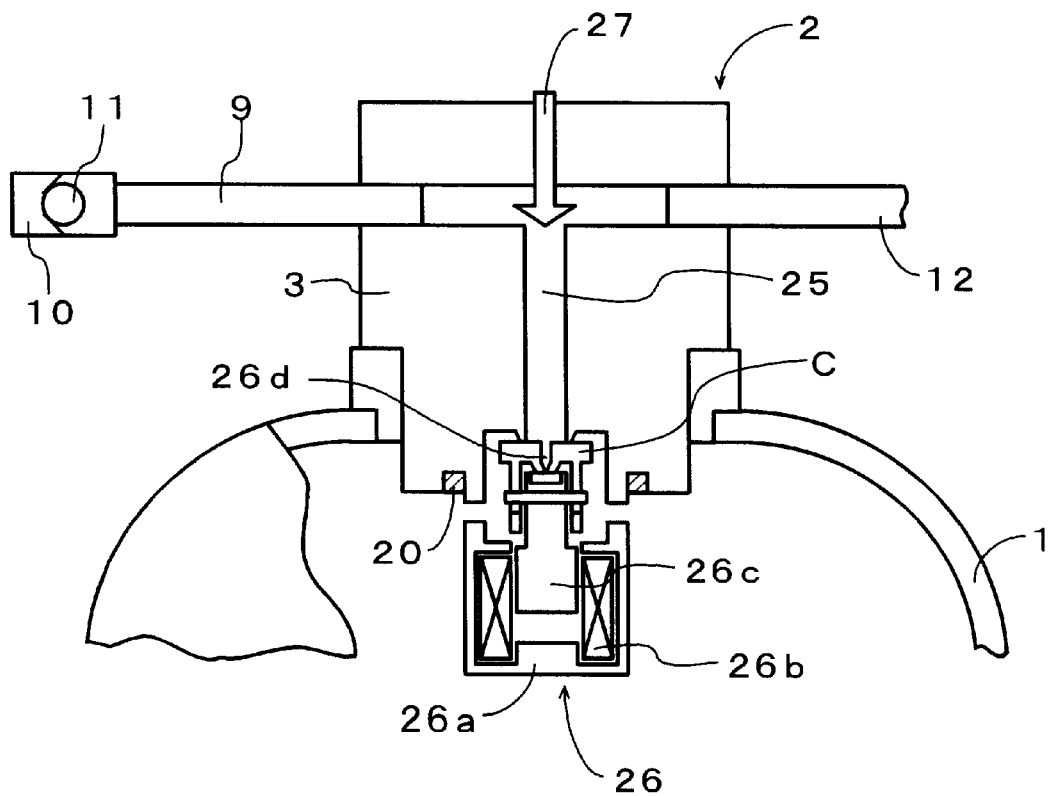
FIG. 9 is a structural view of a gas fuel supply piping system according to a fifth embodiment of the present invention.

FIG. 9 illustrates an arrangement of a piping system according to a fifth embodiment of the present invention, where a single passage 25 serving as both of the filling and the supplying passages is provided in the valve body 3, and equipped with the heater 20. As shown, the single passage 25 extends from the joint between the filling conduit 9 and the supplying conduit 12 to the fuel container 1 and a solenoid valve 26 is mounted to the distal end of the common passage 25. The heater 20 is fitted in a groove provided in the valve body 3 so that it surrounds the solenoid valve 26. A stop valve 27 is for closing and opening the common passage 25.

For the leakage inspection, in FIG. 9, a stop valve 27 is closed and then the inspection gas is introduced from the filling inlet 10 into the conduits 9 and 12. Then, a change in the pressure is monitored in the conduits 9 and 12. After completion of the leakage inspection, the stop valve 27 is opened to communicate the two conduits 9 and 12 with the common passage 25.

The solenoid valve 26 has a coil 26b accommodated in a housing 26a thereof and a plunger 26c provided in the center cavity of the coil 26b for forward and downward movements. When the coil 26b is energized, the plunger 26c of the solenoid valve 26 is moved downwardly into the coil 26b, and a small-diameter pilot orifice 26d is first opened. Then, as the plunger 26c is fully retracted, its poppet valve or distal end C departs from the seat of the valve body 3 to open the common passage 25 into the container 1. For example, such type of solenoid valve is disclosed in Japanese Patent Laid-open Publication No. (Hei)7-301359.

Although the stop valves 7, 13, 16, 19, and 27 in the embodiments are of manually operated types provided for ease of the emergency operation in case of power failure, they may be of an electromagnetic type when the power supply is available.

As set forth above, according to the first aspect of the present invention, the filling passage and the supplying passage are blocked separately to isolate the filling conduit and the supplying conduit from the fuel container. This allows only the filling conduits and the supplying conduits to be filled with an inspection gas for the leakage inspection, and hence saving the time and cost for filling the container with the inspection gas. According to the second aspect, the gas for the leakage inspection can be introduced through the filling inlet for fuel gas to fill up the filling conduit and the supplying conduit at once, while any specific inlet for the inspection gas is not needed.

According to the third aspect of the present invention, both of the filling passage and the supplying passage are bores passing through the valve body thus contributing to the small size and the simple construction of the system.

According to the fourth aspect of the present invention, the stop valves provided across the filling and supply passages are of manually operated types. The leakage inspection will thus be facilitated with the corresponding stop valves manually controlled to determine a suitable pattern of conduit connections for the leakage inspection. According to the fifth aspect of the present invention, a check valve is used in place of the stop valve provided across the supplying passage. This will eliminate the need of manually operating the stop valve to insulate the supplying passage from the supplying conduit for the leakage inspection thereof.

According to the sixth aspect of the present invention, the outlet areas of filling passage and/or the supplying passage are heated by the heater for compensating temperature drop in the filling passage and/or the supplying passage which is caused by Joule-Thomson effect. This will prevent the quality of components provided adjacent to the filling passage and the supplying passage from deteriorating.

According to the seventh aspect of the present invention, the filling passage and the supplying passage are combined to make a single common passage. As the common passage is prevented from temperature drop caused by Joule-Thomson effect, deterioration of the quality of components provided adjacent to the common passage will thus be minimized.

According to the eighth aspect of the present invention, the heater remains energized throughout a desired length of time, thus minimizing the consumption of extra power from a battery or the like.

What is claimed is:

1. A gas fuel supply piping system having a filling conduit for filling a fuel container with a gas fuel for an engine and a supplying conduit for supplying the gas fuel from the fuel container to the engine, comprising:
    a block member serving as a plug of the fuel container;
    a filling passage formed in the block member, the filling passage communicating the filling conduit to the fuel container;
    a supplying passage formed in the block member, the supplying passage communicating the supplying conduit to the fuel container;
    a filling passage stop valve for closing the filling passage, the filling passage stop valve being provided in the filling passage;
    a supplying passage stop valve for closing the supplying passage, the supplying passage stop valve being provided in the supplying passage;
    a gas filling inlet provided on an outward end of the filling conduit; and
    a leakage inspection gas filling inlet provided on the supplying conduit.

2. A gas fuel supply piping system having a filling conduit for filling a fuel container with a gas fuel for an engine and a supplying conduit for supplying the gas fuel from the fuel container to the engine, comprising:
    a block member serving as a plug of the fuel container;
    a filling passage formed in the block member, the filling passage communicating the filling conduit to the fuel container;
    a supplying passage formed in the block member, the supplying passage communicating the supplying conduit to the fuel container;
    a bypass conduit for connecting the filling conduit and the supplying conduit;
    a filling passage stop valve for closing the filling passage, the filling passage stop valve being provided in the filling passage;
    a supplying passage stop valve for closing the supplying passage, the supplying passage stop valve being provided in the supplying passage;
    an intermediate stop valve for closing the bypass conduit; and
    a gas filling inlet provided on an outward end of the filling conduit.

3. The gas fuel supply piping system according to claim 2, wherein the bypass conduit and the intermediate stop valve are provided in the block member.

4. The gas fuel supply piping system according to claim 2, wherein the filling passage stop valve, the supplying passage stop valve, and the intermediate stop valve are of manually operated type.

5. The gas fuel supply piping system according to claim 1, wherein the supplying passage stop valve is a check valve for blocking a backward flow of the gas to the fuel container.

6. The gas fuel supply piping system according to claim 2, wherein the supplying passage stop valve is a check valve for blocking a backward flow of the gas to the fuel container.

7. The gas fuel supply piping system according to claim 1, further comprising a heater provided adjacent to an open end of at least one of the filling passage and the supplying passage and the open end facing to an inside of the fuel container.

8. The gas fuel supply piping system according to claim 2, further comprising a heater provided adjacent to an open end of at least one of the filling passage and the supplying passage and the open end facing to an inside of the fuel container.

9. A gas fuel supply piping system having a filling conduit for filling a fuel container with a gas fuel for an engine and a supplying conduit for supplying the gas fuel from the fuel container to the engine, comprising:
    a block member serving as a plug of the fuel container;
    a common passage formed in the block member, the common passage communicating both the filling conduit and the supplying conduit to the fuel container; and
    a heater provided adjacent to an open end of the common passage and the open end facing to an inside of the fuel container.

10. The gas fuel supply piping system according to claim 7, further comprising a heater control means for energizing the heater in response to commencement of feeding the gas fuel into the container, and for deenergizing it in response to stopping the feeding.

11. The gas fuel supply piping system according to claim 8, further comprising a heater control means for energizing the heater in response to commencement of feeding the gas fuel into the container, and for deenergizing it in response to stopping the feeding.

12. The gas fuel supply piping system according to claim 9, further comprising a heater control means for energizing the heater in response to commencement of feeding the gas fuel into the container, and for deenergizing it in response to stopping the feeding.

13. The gas fuel supply piping system according to claim 7, further comprising a switching means connected in series with the heater and a power source so as to be closed to energize the heater in response to the start of filling the gas fuel into the fuel container; and energizing time limiting means for deenergizing the heater when a predetermined length of time has elapsed after the start of the filling.

14. The gas fuel supply piping system according to claim 8, further comprising a switching means connected in series with the heater and a power source so as to be closed to energize the heater in response to the start of filling the gas fuel into the fuel container; and energizing time limiting means for deenergizing the heater when a predetermined length of time has elapsed after the start of the filling.

15. The gas fuel supply piping system according to claim 9, further comprising a switching means connected in series with the heater and a power source so as to be closed to energize the heater in response to the start of filling the gas fuel into the fuel container; and energizing time limiting means for deenergizing the heater when a predetermined length of time has elapsed after the start of the filling.

16. The gas fuel supply piping system according to claim 7, further comprising a switching means connected in series with the heater and a power source so as to be closed to energize the heater in response to the start of filling the gas fuel into the fuel container;

a pressure sensor for generating a detection signal when a pressure reaches to a predetermined value in the container;

energizing time limiting means for deenergizing the heater when the detection signal is generated.

17. The gas fuel supply piping system according to claim 8, further comprising a switching means connected in series with the heater and a power source so as to be closed to energize the heater in response to the start of filling the gas fuel into the fuel container;

a pressure sensor for generating a detection signal when a pressure reaches to a predetermined value in the container;

energizing time limiting means for deenergizing the heater when the detection signal is generated.

18. The gas fuel supply piping system according to claim 9, further comprising a switching means connected in series with the heater and a power source so as to be closed to energize the heater in response to the start of filling the gas fuel into the fuel container;

a pressure sensor for generating a detection signal when a pressure reaches to a predetermined value in the container;

energizing time limiting means for deenergizing the heater when the detection signal is generated.

19. The gas fuel supply piping system according to claim 1, further comprising a solenoid valve provided at an open end, facing to an inside of the fuel container, of the supplying passage for controlling an opening of the open end.

20. The gas fuel supply piping system according to claim 2, further comprising a solenoid valve provided at an open end, facing to an inside of the fuel container, of the supplying passage for controlling an opening of the open end.

21. The gas fuel supply piping system according to claim 9, further comprising a solenoid valve provided at an open end, facing to an inside of the fuel container, of the common passage for controlling an opening of the open end.

\* \* \* \* \*